United States Patent
Sykes et al.

(10) Patent No.: US 10,332,640 B2
(45) Date of Patent: Jun. 25, 2019

(54) TOROIDAL FIELD COIL FOR USE IN A FUSION REACTOR

(71) Applicant: Tokamak Energy Ltd, Abingdon, Oxfordshire (GB)

(72) Inventors: Alan Sykes, Wantage (GB); Mikhail Gryaznevich, Abingdon (GB); David Kingham, Oxford (GB); David Hawksworth, Abingdon (GB); Ziad Melhem, Abingdon (GB); Steven Ball, Abingdon (GB)

(73) Assignee: TOKAMAK ENERGY LTD, Abingdon, Oxfordshire (GB)

( * ) Notice: Subject to any disclaimer, the term of this patent is extended or adjusted under 35 U.S.C. 154(b) by 499 days.

(21) Appl. No.: 15/021,932

(22) PCT Filed: Sep. 10, 2014

(86) PCT No.: PCT/GB2014/052738
§ 371 (c)(1),
(2) Date: Mar. 14, 2016

(87) PCT Pub. No.: WO2015/036749
PCT Pub. Date: Mar. 19, 2015

(65) Prior Publication Data
US 2016/0232988 A1 Aug. 11, 2016

(30) Foreign Application Priority Data

Sep. 13, 2013 (GB) .................................. 1316334.0
Jun. 9, 2014 (GB) .................................. 1410195.0

(51) Int. Cl.
*G21B 1/05* (2006.01)
*H05H 1/12* (2006.01)

(52) U.S. Cl.
CPC ............... *G21B 1/057* (2013.01); *G21B 1/05* (2013.01); *H05H 1/12* (2013.01); *Y02E 30/122* (2013.01); *Y02E 30/126* (2013.01); *Y02E 30/128* (2013.01)

(58) Field of Classification Search
CPC ............. G21B 1/057; G21B 1/05; H05H 1/12
(Continued)

(56) References Cited

U.S. PATENT DOCUMENTS 4,268,353 A 5/1981 Powell

FOREIGN PATENT DOCUMENTS

GB 2510447 A 8/2014
JP S60263408 A 12/1985
(Continued)

OTHER PUBLICATIONS

Nishio, Satoshi, "Can we obtain the realistic power reactor in the ST approach?" and "Feasible approach to the power reactor concept", Jul. 25, 2004, Journal of Plasma and Fusion Research vol. 80, No. 11, pp. 944-948.
(Continued)

*Primary Examiner* — Jack W Keith
*Assistant Examiner* — Daniel Wasil
(74) *Attorney, Agent, or Firm* — Cantor Colburn LLP (57) ABSTRACT

A toroidal field coil for generating a toroidal magnetic field in a nuclear fusion reactor includes a toroidal plasma chamber having a central column. The toroidal field coil has a plurality of windings configured to pass through the central column and around the outside of the plasma chamber. Each winding includes a cable having a plurality of stacked high temperature superconductor (HTS) tapes, each HTS tape including one or more layers of a high temperature superconductor material. With the toroidal field coil in place in the reactor, a face of each HTS tape is substantially perpendicu-
(Continued)

lar to a direction of maximal neutron flux during reactor operation as the cable passes through the center column.

20 Claims, 4 Drawing Sheets

(58) Field of Classification Search
USPC .................................................. 376/133, 137
See application file for complete search history.

(56) References Cited

FOREIGN PATENT DOCUMENTS

| JP | H0339690 A | 2/1991 |
|---|---|---|
| WO | 0106524 A2 | 1/2001 |
| WO | 2013030554 A1 | 3/2013 |

OTHER PUBLICATIONS

Yanagi, Nagato et al., "Conceptual design of the superconducting magnet system for the helical fusion reactor", Apr. 25, 2013, Journal of Plasma and Fusion Resarch vol. 89, No. 6, pp. 374-383.
A. Sykes, "The ST25 Tokamak for Rapid Technological Development" 2013 IEEE 25th Symposium on Fusion Engineering, Jun. 2013, pp. 1-4, XP002732546.
British Search Report for corresponding GB1316334.0; Report dated May 29, 2014.
British Search Report for corresponding GB1410195.0; Report dated Feb. 26, 2015.
International Preliminary Report on Patentability for corresponding application PCT/GB2014/052738 filed Sep. 10, 2014; Report dated Sep. 7, 2015.
International Search Report for corresponding application PCT/GB2014/052738 filed Sep. 10, 2014; dated Dec. 8, 2014.
Jinxing Zheng, "Concept design of Hybrid Superconducting Magnet for CFETR Tokamak Reactor", 25th IEEE Symposium on Fusion Engineering (SOFE), Jun. 2013, pp. 1-6.
L. Bromberg, "Status of High Temperature Superconducting Magnet Development", Dec. 2010, Retrieved from Internet: URL: http://www.psfc.mit.edu; XP002732544.
M. Gryaznevich, Progress in application of high tempature superconductor in tokamak magnets Fusion Engineering and Design 88, (2013) 1593-1596, XP002732545.
T. Ando, "Design of the TF Coil for a Tokamak Fusion Power Reactor with YBCO Tape Superconductors", 21st IEEE/NPS Symposium on Fusion Engineering, Sep. 2005, pp. 1-4.
Written Opinion for corresponding application PCT/GB2014/052738 filed Sep. 10, 2014; dated Dec. 8, 2014.

TOROIDAL FIELD COIL FOR USE IN A FUSION REACTOR

TECHNICAL FIELD

The present application relates to a compact fusion reactor operated at high toroidal field. In particular, though not exclusively, the invention relates to a spherical tokamak reactor suitable for use as an energy source or as a highly efficient neutron source, and having a plasma confinement system including high temperature superconductor (HTS) coils.

BACKGROUND

The challenge of producing fusion power is hugely complex. Many alternative devices apart from tokamaks have been proposed, though none have yet produced any results comparable with the best tokamaks currently operating such as JET.

World fusion research has entered a new phase after the beginning of the construction of ITER, the largest and most expensive (c15bn Euros) tokamak ever built. The successful route to a commercial fusion reactor demands long pulse, stable operation combined with the high efficiency required to make electricity production economic. These three conditions are especially difficult to achieve simultaneously, and the planned program will require many years of experimental research on ITER and other fusion facilities, as well as theoretical and technological research. It is widely anticipated that a commercial fusion reactor developed through this route will not be built before 2050.

To obtain the fusion reactions required for economic power generation (i.e. much more power out than power in), the conventional tokamak has to be huge (as exemplified by ITER) so that the energy confinement time (which is roughly proportional to plasma volume) can be large enough so that the plasma can be hot enough for thermal fusion to occur.

WO 2013/030554 describes an alternative approach, involving the use of a compact spherical tokamak for use as a neutron source or energy source. An important consideration in the design of spherical tokamaks is the strength of the toroidal magnetic field, $B_T$, which is generated by coils which pass through the central column. The challenge of keeping the central column small enough for a small tokamak to be possible while maximizing $B_T$ is addressed in this document by the use of high temperature superconductor material (HTS) in the toroidal field coils.

The optimization of the material and configuration for such HTS coils has a significant bearing on the field obtainable and thus the efficiency of the reactor.

SUMMARY

In accordance with one aspect of the present invention there is provided a toroidal field coil for generating a toroidal magnetic field in a nuclear fusion reactor comprising a toroidal plasma chamber having a central column, the toroidal field coil comprising a plurality of windings configured to pass through the central column and around the outside of the plasma chamber. Each winding includes a cable comprising a plurality of stacked HTS tapes, each HTS tape including one or more layers of a high temperature superconductor material. The HTS tapes are arranged such that a face of each HTS tape is perpendicular to a direction of maximal neutron flux during reactor operation as the cable passes through the center column. They may be twisted torsionally as the cable passes around the outside of the plasma chamber.

In accordance with another aspect of the present invention there is provided a toroidal field coil for generating a toroidal magnetic field in a nuclear fusion reactor comprising a toroidal plasma chamber having a central column, the toroidal field coil comprising a plurality of windings configured to pass through the central column and around the outside of the plasma chamber. Each winding includes a cable comprising a plurality of HTS tapes, each HTS tape including one or more layers of a high temperature superconductor material. At least one of the cables configured to pass close to the center of the central column may have a smaller cross-section than a cable configured to pass through the central column further away from the center.

At least one of the cables configured to pass close to the center of the central column may have a smaller cross-section than a cable configured to pass through the central column further away from the center.

The at least one cable configured to pass close to the center of the central column may carry current at a higher current density than the cable configured to pass further away from the center.

The stacked HTS tapes may be optionally arranged such that a face of each HTS tape is substantially parallel to the toroidal (and poloidal) magnetic field as the cable passes through the central column. The stacked HTS tapes may be arranged such that they are twisted torsionally as the cable passes around the outside of the plasma chamber.

Each cable may include a plurality of stacked HTS tapes, optionally arranged such that a face of each HTS tape is substantially parallel to the toroidal (and poloidal) magnetic field as the cable passes through the central column. The stacked HTS tapes may be arranged such that they are twisted torsionally as the cable passes around the outside of the plasma chamber.

Alternatively, each cable may include a plurality of HTS tapes arranged around a copper core.

The toroidal field coil may further comprise a cooling system capable of cooling the cables to 77K or less, more preferably to 30K or less, more preferably to 4K or less. The toroidal magnetic field in use is optionally 3 T or more, preferably 5 T or more, preferably 10 T or more, more preferably 15 T or more.

The invention also provides a nuclear fusion reactor comprising a plasma chamber having a central column and the toroidal field coil described above. The central column may comprises a central core in which a solenoid is located or insertable. The reactor may comprise four or more toroidal field coils.

The fusion reactor may be configured to confine plasma in the plasma chamber with a major radius of the confined plasma of 1.5 m, preferably less than 1.0 m, more preferably less than 0.5 m. The reactor may have an aspect ratio of 2.5 or less and is preferably a spherical tokamak reactor with aspect ratio of 2.0 or less.

Shielding may be provided around the central column in order to reduce or eliminate damage from neutrons. At least a portion of an outer part of the central column may be made of a non-HTS material that provides shielding against damage to the HTS tape from neutrons. This non-HTS material may be configured to carry a current to enhance the toroidal magnetic field. The outer part of the central column may be cryogenically cooled, preferably to 77K, more preferably to less than 40K in order to reduce resistive heating. The non-HTS material may include beryllium and/or aluminum.

In accordance with another aspect of the present invention there is provided a method of generating neutrons or energy by operating a nuclear fusion reactor comprising a toroidal plasma chamber. The method comprises initiating a plasma in the plasma chamber, generating a toroidal magnetic field using the toroidal field coil described above, and emitting neutrons and other energetic particles.

BRIEF DESCRIPTION OF THE DRAWINGS

Some preferred embodiments of the invention will now be described by way of example only and with reference to the accompanying drawings, in which.

DETAILED DESCRIPTION

The present application is based on a very compact form of the tokamak, and employs a range of innovative features, including use of High Temperature Superconducting magnets. The 'Efficient Compact Fusion Reactor' (ECFR) is intended to provide a compact fusion power plant.

Fusion neutrons are produced when a deuterium-tritium (D-T) or deuterium-deuterium (D-D) plasma becomes very hot so that the nuclei fuse together, releasing energetic neutrons. To date, the most promising way of achieving this is to use a tokamak; in the conventional tokamak approach to fusion (as embodied by ITER), the plasma needs to have high confinement time, high temperature, and high density to optimize this process.

A tokamak features a combination of strong toroidal magnetic field $B_T$, high plasma current $I_p$ and usually a large plasma volume and significant auxiliary heating, to provide a hot stable plasma so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a habit of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realization of this concept in the START tokamak at Culham demonstrated a huge increase in efficiency—the magnetic field required to contain a hot plasma can be reduced by a factor of 10. In addition, plasma stability is improved, and build costs reduced.

A drawback of the ST is that the limited space in the central column prohibits installation of the substantial shielding necessary to protect the central windings in a neutron environment—so conventional toroidal field windings, and conventional central solenoids (used to induce and maintain the plasma currents) are not practical. Although power plants based on the ST have been designed (using solid copper center posts with limited shielding, the post being changed every year or so when damaged by neutrons), these have high energy dissipation in the center column due to the relatively high resistivity of warm copper, requiring a large device for electricity production to become economical.

An important factor is the strength of the toroidal magnetic field, $B_T$. Fusion power from thermal fusion in a tokamak is proportional to the fourth power of $B_T$ and so tokamaks are designed to use the maximum possible $B_T$ consistent with the significant stresses this imposes, and the significant costs of electricity required to power these magnets. To minimize these costs, long-pulse modern devices such as ITER feature LTS magnets cooled by liquid helium.

The present limit of the high-field approach is exemplified by the medium-sized IGNITOR project, now under development as a joint Russian—Italian project: IGNITOR is predicted to achieve short pulse ignition without need of extensive auxiliary heating, by virtue of its very high field $B_T$, ~13 Tesla at the plasma major radius (1.43 m) and ~20 T at the edge of the center stack, obtained by conventional copper magnets with a steel support structure.

A drawback of the ST approach is that, due to the reduced space in the center column, the toroidal field magnet therein is of limited size and so only relatively low toroidal fields of less than 1 Tesla have been achieved in STs to date. This problem is overcome in ECFR by use of High Temperature Superconducting magnets.

Until now it has been thought that a smaller scale approach could not lead to an economic fusion energy power plant, as the input neutral beam injection (NBI) power is relatively large and the magnetic fields are not sufficient to contain the hot, charged alpha particles produced by fusion reactions within the plasma, which therefore loses the self-heating they could provide, and which is a key feature of conventional tokamak designs aimed at fusion power production. However recent advances in technology may enable these small STs to achieve high magnetic field, as described below.

Recent advances in high temperature superconductors (HTS) have far-reaching consequences for fusion. Whereas conventional low temperature superconductor (LTS) magnets use temperatures in the liquid helium range (~4K), HTS can give similar results at the more convenient and easier to achieve liquid nitrogen temperature of 77K or even higher.

But the advantages of HTS far exceed cost and convenience. If HTS is actually operated at lower temperatures than 77K, the current-carrying ability is greatly increased, and the conductor can operate in much higher fields. The combination of higher maximum field, increased current-carrying capability and reduced complexity of cooling means that very high toroidal field HTS magnets may be possible in the limited space of a low aspect ratio tokamak core.

High Temperature Superconducting technology continues to advance rapidly. The first generation HTS material, BSCCO, was rapidly overtaken by YBCO. As well as the discovery of new HTS materials with fundamentally higher critical fields and critical currents, the engineering performance of existing materials such as YBCO (or, more generally (Re)BCO where Re is a rare earth atom) is rapidly being improved with the result that magnets made from HTS can achieve increasingly high fields from increasingly small conductors. In the present specification, it will be understood that HTS materials include any material which has superconducting properties at temperatures above about 30 K in a low magnetic field.

The performance of HTS under intense high energy neutron bombardment is not yet known, however there are concerns that it will need more than 10 cm of shielding in order to remain effective for months or years of operation. This amount of shielding may be too large to accommodate around the central column of a small spherical tokamak. Several alternative means may be utilized to allow a high current to pass through the central column.

Figure 1A:
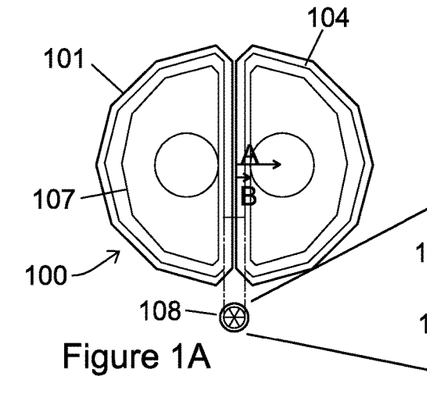
FIG. 1A is a cross section through a plasma vessel and toroidal field coil structure.
Figure 1B:
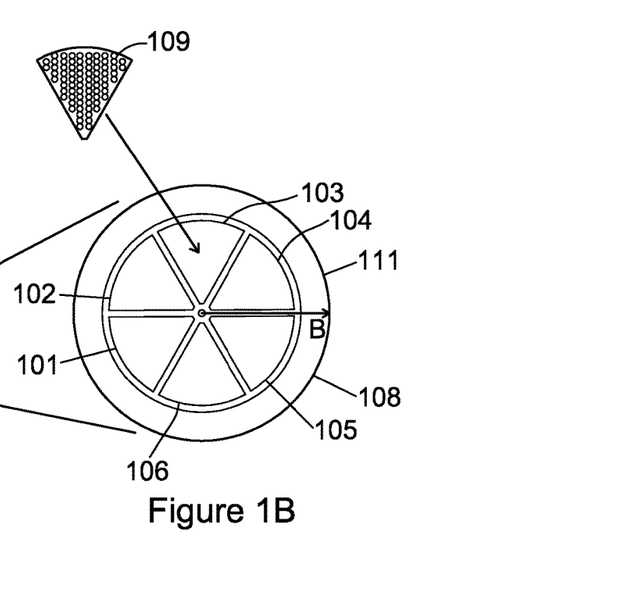
FIG. 1B is a cross section through a central column of the plasma vessel of FIG. 1A.

FIG. 1A is a schematic cross section through two coils 101, 104 of a six-coil toroidal field coil structure 100 for use in a plasma vessel 107. FIG. 1B is a cross section through a central column 108 of the vessel 107 showing all six coils 101-106, each occupying a wedge of the central column 108. Each coil 101, 102 comprises a series of windings of cable 109 which include HTS material. As described in more detail below, in one example the cable 109 is formed from layers or other configurations of HTS tape. The windings pass through the central column 108 and around the outside of the vessel 107. The geometry factor of the field coils is defined as B/A where A is the major radius of a plasma confined by the coils and B is the radius of the central column 108. Within the central column 108, the coils are separated from one another by non-HTS material 110 such as beryllium, copper or aluminum. A layer 111 of non-HTS material such as beryllium, copper or aluminum may also arranged around the outside of the HTS windings. This provides shielding from neutrons and may also carry some current. The coils are cooled by a cryostat (not shown) to a low temperature, optionally 77 K or preferably to 30 K or below, more preferably 4 K. The shielding layer 111 may also be cooled to the same temperature.

Figure 2:
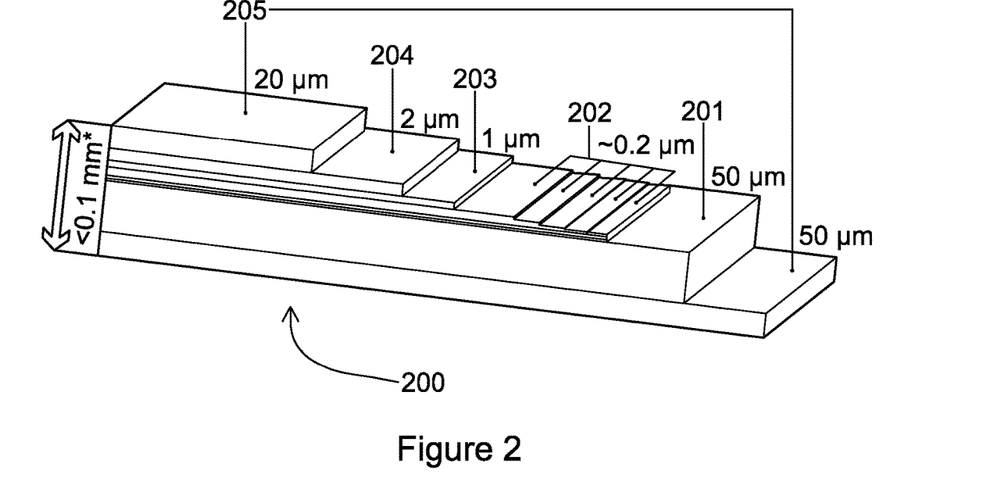
FIG. 2 shows the structure of one example of HTS tape.

FIG. 2 is a schematic illustration of the components of standard HTS tape 200. Such tape 200 is generally approximately 100 microns thick, and includes an electropolished hasteloy substrate 201 approximately 50 microns thick, on which is deposited by IBAD or magnetron sputtering a series of buffer stack layers 102, each approximately 0.2 microns thick. An epitaxial (RE)BCO-HTS layer 303 (deposited by MOCVD) overlays the buffer layer, and is typically 1 micron thick. A two micron silver layer 204 is deposited on the HTS layer by sputtering, and 20 micron copper stabilizer layers 205 are electroplated onto both sides of the tape. In order to increase the current in the tape, the thickness of the HTS layer may be increased from around 1 micron to between 4 and 20 microns. This increases the current that can be carried by a factor of between 2 and 5 and increases the neutron tolerance by a factor of between 4 and 20. As mentioned above, the overall tape thickness is normally 200 microns, so if this is the only change made, the increase in tape thickness will be less than 20%.

Another approach is to reduce the thickness of the copper 205 and hasteloy 201 layers (or other conducting/supporting non-HTS layers in the tape). Halving the thickness of these non-HTS layers approximately doubles the current density in the tape, allowing more space for shielding. However the copper has the beneficial effect of providing an alternative current path if the current in the superconducting material temporarily exceeds the critical current in that material.

The use of an outer cryogenically cooled beryllium, copper or aluminum central column with an inner part is also beneficial. There would be undesirable resistive losses in the beryllium or aluminum, but these can be minimized by cooling, ideally to 30K or lower and by connecting the beryllium or aluminum/HTS central column to HTS outer arms of the toroidal field coils. Beryllium or aluminum is chosen because it has low resistivity at temperatures of 30K or lower and because it is resistant to damage from high energy neutrons. Other elements or materials with these properties, or similar properties, could also be used.

The tapes can be formed into cables in a variety of ways. One option is to wrap sections of tape around a copper core, so that the copper can provide an alternative current path if the current in the superconducting material temporarily exceeds the critical current in that material.

Figure 3:
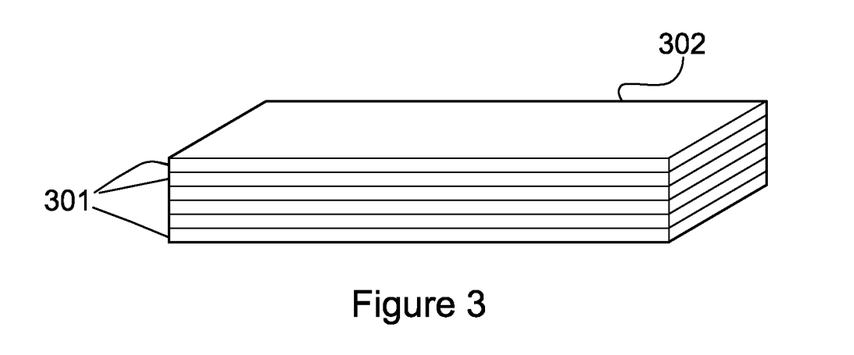
FIG. 3 is a schematic illustration of a section of cable formed by stacked tape.

An alternative is to stack the tape in layers, so that the bottom face of one tape lies directly on top of the top face of the next tape. This allows the tape to be packed very tightly together and forces the maximum possible amount of HTS material into a cable. This arrangement is shown in FIG. 3, which is a schematic view of a short section of a plurality of HTS tapes 301 stacked one on top of the other to form a cable 302. In general, in order for the current to be shared equally between all the tapes in a cable it is advisable for the cable to be twisted along its length.

Figure 4:
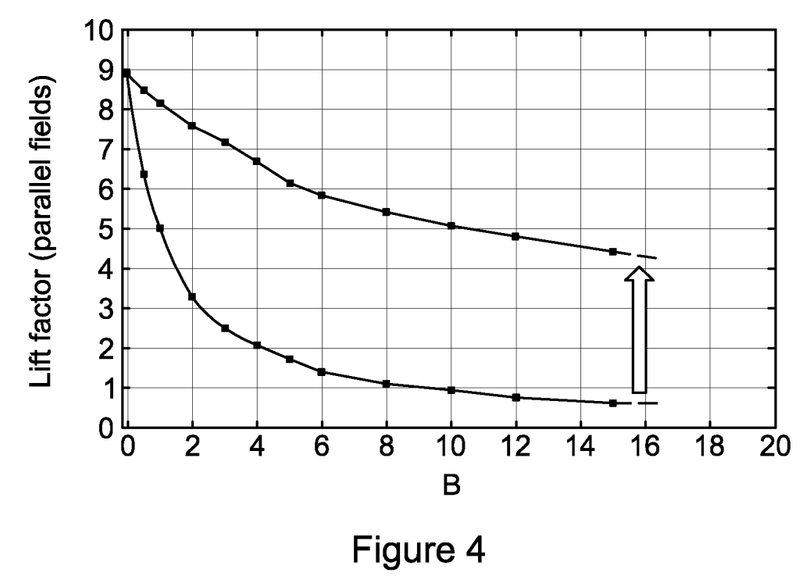
FIG. 4 illustrates the lift factor at 20K as a function of magnetic field for YBCO tape for magnetic field perpendicular or parallel to the tape.

However, an important and valuable feature of ReBCO HTS tape is that, while a perpendicular magnetic field has a large effect in reducing critical current, a parallel magnetic field has much less adverse effects, as can be seen from FIG. 4, which shows the lift factor at 20K as a function of magnetic field for YBCO tape for magnetic field perpendicular or parallel to the tape. Lift factor is the ratio of critical current to the critical current at 77K and zero applied field.

In a tokamak, it is possible to arrange the HTS tapes in the central column 108 (the location of highest field and least available space) so that they lie parallel, or nearly parallel, to the toroidal and poloidal magnetic fields. This enables the critical current of material in the region with the highest magnetic field to be as high as possible. The twisting required to share the current between the tapes in the cable can occur in the outer limbs where the magnetic fields are lower.

Figure 5:
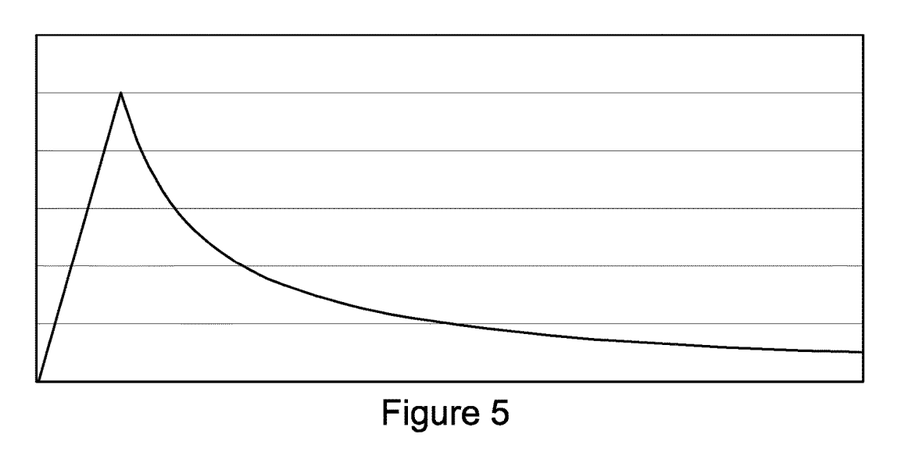
FIG. 5 shows the radial distribution of the (dominant) toroidal magnetic field in a tokamak.

Even with this parallel arrangement of tapes in the center column, there is still an effect of reduced critical current in locations where the magnetic field is highest. FIG. 5 shows the radial distribution of the (dominant) toroidal magnetic field in a tokamak, showing a maximum at the edge of the conductor and a reduction of field close to the center of the central column. It is apparent from this that the magnetic field near the center of the column is significantly lower than at the edge, and this means that the critical current for HTS material closer to the center will therefore be higher than for HTS material near the edge. It is therefore possible for HTS material nearer the center to operate at a higher current density than that nearer the edge.

Figure 6A:
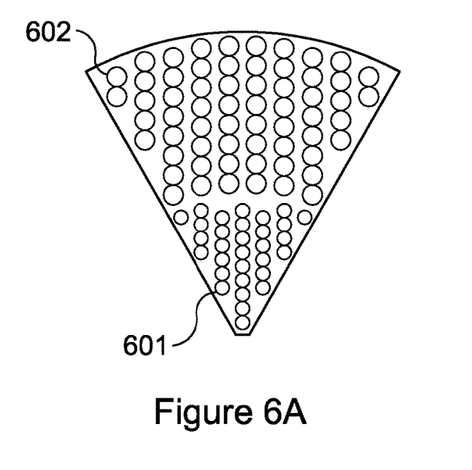
FIGS. 6A and 6B illustrate examples of wedges of cable windings.
Figure 6B:
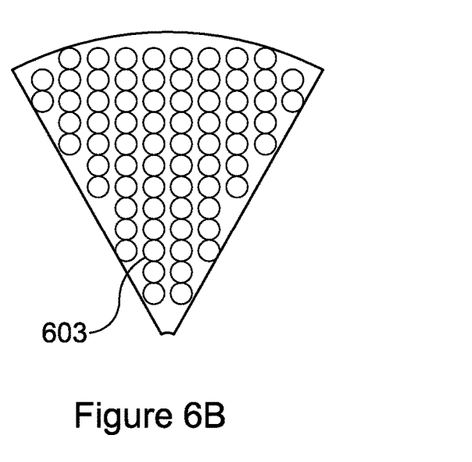

It is possible to arrange the cables so that the current density is increased in the locations with the lowest field, specifically towards the middle of the central column. This increase in current density can be achieved in various ways, including:

i) Having smaller cables 601 in the lower field regions, but carrying the same current as cables 602 in the higher field regions (FIG. 6A)—this allows more cables to be fitted into the same space ii) Having all cables 603 of the same size, but with cables in the lower field regions carrying higher current (FIG. 6B)

iii) A combination of both of the above.

In each case there can be two or more regions of different cable sizes or current, or a steady gradation from smaller cables in the middle of the central column to larger cables towards the outside of the central column and from higher current in the middle of the central column to lower current towards the outside of the central column.

The magnet may be wound in a series of layers with smaller cables in the lower field regions carrying the same current as larger cables in the higher field regions.

In order to reduce the damaging effects of neutron flux on the HTS tape, it may be arranged so that the strips lie perpendicular to the maximal neutron flow (i.e. facing radially outwards from the center column). This results in neutron interactions generally damaging small patches of multiple pieces of tape, rather than a larger strip of a single piece of tape. This is advantageous as a larger amount of damage to a single piece of HTS tape, and particularly a linear "track" across the width of a tape, is more likely to cause the superconductor to gain resistance which would result in excess heat generation, disrupting the cooling of the remaining tape. Sufficient damage may even cause the magnet to quench, which will result in significant damage to the coils. By contrast, if the damage is spread over multiple tapes, or multiple separate regions of the same tape, it takes longer for the damage in one tape to accumulate to the point where the tape is no longer usable. As such, the usable lifetime of the HTS coils is increased.

The critical field of the HTS tapes is affected by the strain in the tapes. Any strain will act to reduce the critical field. Wrapping the tape into coils and the forces experienced during operation of the reactor will tend to cause strain on the tapes, which reduces the critical field strength of the HTS, and could cause a loss of superconductivity. It would therefore be advantageous to introduce some compression to the tapes during manufacture, so that the resulting strain while in use is reduced or eliminated. This compression may be introduced when the coil is wound or at an earlier stage in the process. The strain is predominantly along the longitudinal axis of the tape (i.e. along the length of the tape, parallel to the HTS layer), therefore the compression introduced should also be along this axis. A compression causing a strain of −0.2% is potentially very useful, and would allow the material to operate at up to double the field possible without pre-compression. Even an increase in critical field of 10-20% would be extremely beneficial.

Figure 7A:
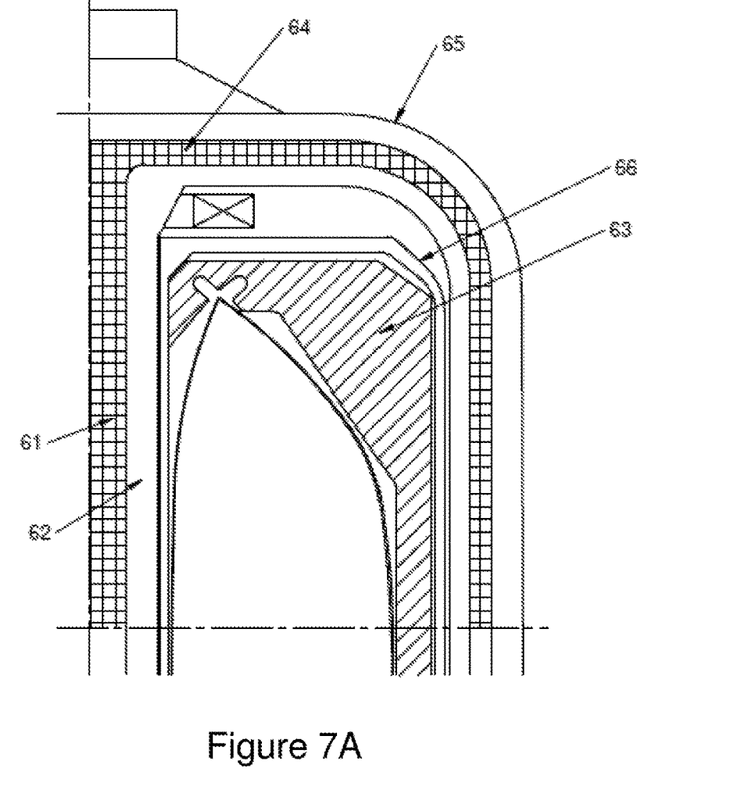
FIG. 7 shows a quarter cross section through a spherical tokamak with HTS toroidal field magnets with limited neutron shielding and different configurations of the central column to provide more resilience to neutron bombardment

A quarter cross section of a spherical tokamak with HTS magnets suitable for use as an energy or neutron source is shown in FIG. 7A. The important features of this tokamak are a central column 61 that can be either HTS or beryllium or aluminum, thermal insulation and cooling channels 62 to allow the center post to be cooled, shielding 63 to prevent neutron damage to the outboard coil 64 made from HTS, a cryostat 65 to cool the HTS and a vacuum vessel 66 which can be inside or outside the shielding 63.

There are several options for the center post 61. One option includes HTS with or without neutron shielding.

Figure 7B:
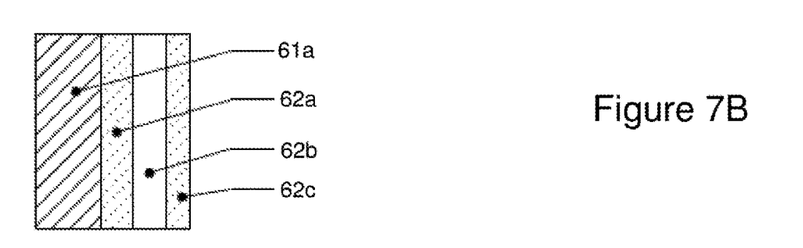

Another option is shown in FIG. 7B and includes an inner part 61a of beryllium, copper, aluminum or another non-HTS material, a coolant channel 62a, vacuum insulation 62b and thermal insulation 62c. There would be undesirable resistive losses in the beryllium, copper or aluminum, but these can be minimized by cooling, ideally to 30K or lower and by connecting the beryllium, copper or aluminum central post to HTS outer arms of the toroidal field coils. Beryllium, copper or aluminum is chosen because it has low resistivity at temperatures of 30K or lower and because it is resistant to damage from high energy neutrons. Other elements or materials with these properties, or similar properties, could also be used.

Figure 7C:
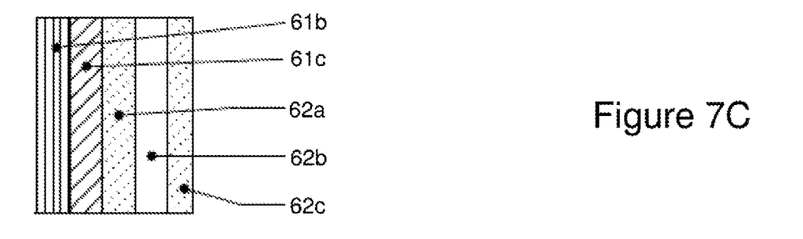

A further option is shown in FIG. 7C and is formed by a combination in which an inner part 61b is made of HTS and an outer part 61c is made of beryllium, copper, aluminum or another non-HTS material that provides some shielding against damage to the HTS from neutrons. Additional neutron shielding can be added to each option, subject to the space constraints in a spherical tokamak. Both are cryogenically cooled. The beryllium, copper or aluminum outer provides some shielding of the HTS. Cooling, ideally to 30K or lower, and connecting the beryllium, copper or aluminum /HTS central post to HTS outer arms of the toroidal field coils is still necessary to minimize resistive losses.

A combination of these techniques could be used.

It will be appreciated that compact fusion reactors such as those described herein have a much larger surface area per unit plasma volume than bigger tokamaks. In general costs and implementation difficulty scale at least linearly with plasma volume, while energy output (which can be considered to be limited by acceptable damage levels) scales linearly with surface area. In addition, the costs of a "one (or few) of a kind" device are well known to be higher than the costs of "many of a kind" devices. It therefore seems likely that many smaller fusion reactors should be cheaper per unit net power output than one large fusion reactor.

It will be appreciated that variations from the above described embodiments may still fall within the scope of the invention.

The invention claimed is:

1. A toroidal field coil for generating a toroidal magnetic field in a nuclear fusion reactor comprising a toroidal plasma chamber having a central column, the toroidal field coil comprising a plurality of windings configured to pass through the central column and around the outside of the plasma chamber; wherein:
    each winding includes a cable comprising a plurality of stacked high temperature superconductor (HTS) tapes, each HTS tape including one or more layers of a high temperature superconductor material; and
    with the toroidal field coil in place in the reactor, a face of each HTS tape is substantially perpendicular to a direction of maximal neutron flux during reactor operation as the cable passes through the center column.

2. The toroidal field coil of claim 1, wherein the stacked HTS tapes are arranged such that they are twisted torsionally as the cable passes around the outside of the plasma chamber.

3. The toroidal field coil of claim 1, wherein at least one of the cables configured to pass closer to the center of the central column has a smaller cross section than a cable configured to pass through the center column further away from the center.

4. The toroidal field coil of claim 1, wherein the stacked HTS tapes are arranged such that a face of each HTS tape is substantially parallel to a poloidal magnetic field as the cable passes through the central column.

5. The toroidal field coil of claim 1, wherein the HTS tapes are pre-compressed along a longitudinal axis of the tape.

6. The toroidal field coil of claim 1, wherein at least one of the cables configured to pass closer to the center of the central column carries current at a higher current density than a cable configured to pass further away from the center.

7. The toroidal field coil of claim 1, wherein a top and bottom face of each HTS tape is formed from copper.

8. The toroidal field coil of claim 1, wherein each HTS tape comprises one or more copper layers.

9. The toroidal field coil of claim 1, further comprising a cooling system capable of cooling the cables to 77K or less.

10. A nuclear fusion reactor comprising a plasma chamber having a central column, characterised in that the nuclear fusion reactor comprises the toroidal field coil of claim 1.

11. The fusion reactor of claim 10, wherein the central column comprises a central core in which a solenoid is located or insertable.

12. The fusion reactor of claim 10, comprising four or more toroidal field coils.

13. The fusion reactor of claim 10, configured to confine plasma in the plasma chamber with a major radius of the confined plasma of 1.5 m.

14. The fusion reactor of claim 10, which reactor has an aspect ratio of 2.5 or less.

15. The fusion reactor of claim 10, in which shielding is provided around the central column in order to reduce or eliminate damage from neutrons.

16. The fusion reactor of claim 10, in which at least a portion of an outer part of the central column is made of a non-HTS material that provides shielding against damage to the HTS tape from neutrons.

17. The fusion reactor of claim 16, wherein the non-HTS material in the outer part of the central column is configured to carry a current to enhance the toroidal magnetic field.

18. The fusion reactor of claim 17, in which the outer part of the central column is cryogenically cooled, preferably to 77K.

19. The fusion reactor of claim 17, wherein the non-HTS material includes beryllium and/or aluminum.

20. A method of generating neutrons or energy by operating a nuclear fusion reactor comprising a toroidal plasma chamber, the method comprising:
   initiating a plasma in the plasma chamber;
   generating a toroidal magnetic field using the toroidal field coil of claim 1; and
   emitting neutrons and other energetic particles.

* * * * *